United States Patent [19]

Stencel

[11] Patent Number: 4,742,735
[45] Date of Patent: May 10, 1988

[54] DRIVER FOR A LOBED COLLAR

[75] Inventor: Edgar L. Stencel, Huntington Beach, Calif.

[73] Assignee: VSI Corporation, Pasadena, Calif.

[21] Appl. No.: 250,895

[22] Filed: Apr. 3, 1981

Related U.S. Application Data

[63] Continuation-in-part of Ser. No. 849,756, Nov. 9, 1977, Pat. No. 4,260,005.

[51] Int. Cl.$^4$ .............................. B25B 13/06
[52] U.S. Cl. .............................. 81/121.1
[58] Field of Search .............. 81/121 R, 125, 186

[56] References Cited

U.S. PATENT DOCUMENTS

| | | | |
|---|---|---|---|
| 2,219,907 | 10/1940 | Ross | 81/125 U |
| 2,248,695 | 7/1941 | Bradshaw | 81/125 X |
| 2,811,631 | 10/1957 | Wood | 81/121 R X |
| 2,909,954 | 10/1959 | Rhoads | 81/186 |
| 3,763,725 | 10/1973 | Reiland | 81/121 R |
| 3,979,979 | 9/1976 | Grabovac | 81/121 R |

Primary Examiner—Debra S. Meislin
Attorney, Agent, or Firm—Christie, Parker & Hale

[57] ABSTRACT

A driver has a deltoid wrenching and deforming socket in the form of an equilateral triangle with rounded corners. Flats of the socket between the apexes of the triangle bear on lobes of a collar to thread the collar onto a pin in the making of a joint. At a predetermined clamp-up load on the joint, the flats of the deltoid socket crush the lobes plastically and force material of the collar radially inward of the lobes into locking engagement with the pin. Thereafter the socket can rotate freely on the collar. A pilot section of the deltoid socket cooperates with a corresponding section of the collar to keep the driver from canting off axis. Reliefs with cylindrical surfaces in the sides of extensions of the flats define piloting surfaces of the pilot section.

14 Claims, 2 Drawing Sheets

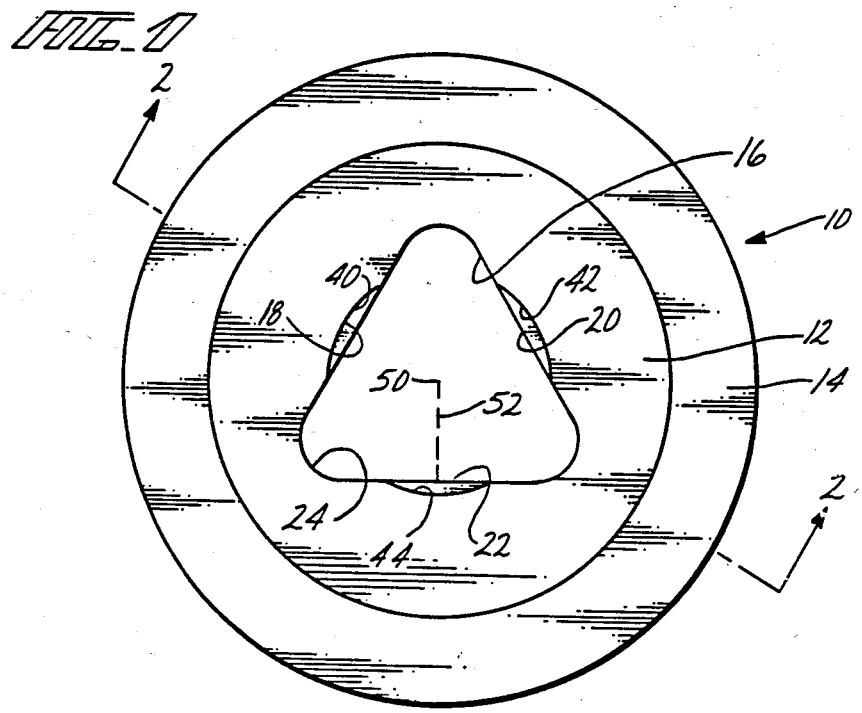
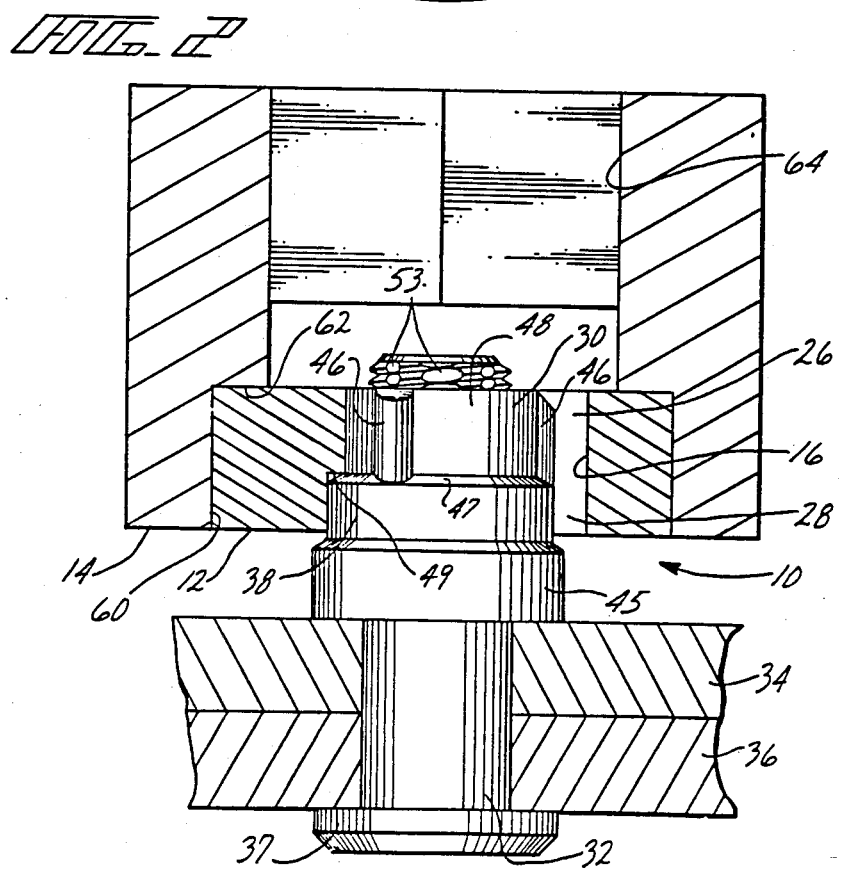

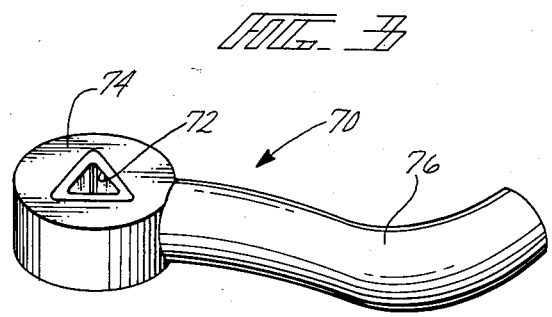
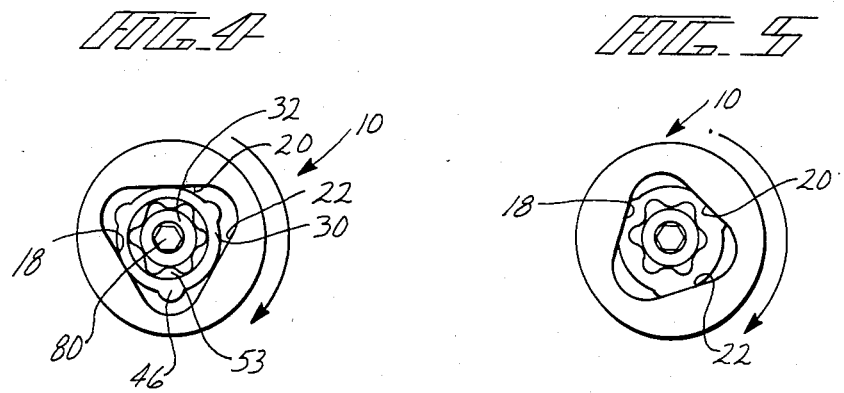

DRIVER FOR A LOBED COLLAR

CROSS-REFERENCE TO RELATED APPLICATIONS

The present application is a continuation-in-part of application Ser. No. 849,756 filed Nov. 9, 1977, now U.S. Pat. No. 4,260,005.

BACKGROUND OF THE INVENTION

The present invention relates to socket-type setting tools for setting threaded collars in general, and, more in particular, to a driver having wrenching and deforming flats that tighten a collar onto a pin and against a sheet and thereafter crush lobes of the collar upon the application of a predetermined amount of force corresponding to a desired clamp-up load of the collar on the sheet.

The parent to this application is directed to a fastener system that employs an internally threaded collar (nut) and an externally threaded pin (bolt). In a very general way the collar and pin cooperate like a standard nut and bolt in that they are adapted to clamp between them sheets or workpieces. The collar, however, has plastically deformable lobes extending longitudinally along an outer surface. These lobes in turn have surfaces which parallel the axis of the collar. The lobes are capable of being deformed plastically and to deform material of the collar radially inward of the lobes plastically into void volumes between the collar and the pin. Preferably, these void volumes are defined by flutes on the pin. Collar material displaced into the flutes forms an interference lock between the collar and the pin. The lock occurs simultaneously with the attainment of a desired clamp-up load on the sheets or workpieces. With the plastic deformation of the lobes, they disappear as wrenching means and therefore the load on the sheets cannot exceed the design load.

The parent application describes a driver having a deltoid socket. The socket has flats which intermediate the apexes of the deltoid engage the lobes of the collar. These flats crush the lobes into the body of the collar. The minimum radius to each of the flats corresponds to the radius of the collar at the base of the lobes. Stated differently, this corresponds to the radius of the collar to a right cylindrical section of the collar from which the lobes protrude.

It is desirable that the driver have long life and that its working surfaces be of the same radius at corresponding points. The latter requirement is necessary so that the amount of material of the lobes failed in radial compression be predictable and the same from tool-to-tool to hold the clamp-up load to within close tolerances. It is also desirable that the driver not cant relative to the axis of the collar during the setting of the collar in order that the lobes be failed properly. For example, if there were some canting of the driver, not all of the material of the lobes would fail and the clamp-up load would fall short of that desired.

SUMMARY OF THE INVENTION

The present invention provides a driver adapted to thread a collar onto a pin and to deform external lobes of the collar plastically into the collar and collar material ahead of the deforming lobes into void spaces between the collar and the pin. This deformation locks the collar and the pin together and removes the purchase that the driver had on the collar and thereby prevents further tightening of the collar.

In one form the driver has a socket with flats that in cross section fall on the sides of a regular polygon. The flats bear on lobes of a collar to thread the collar onto the pin, and, when the collar engages a workpiece with sufficient axial force, to plastically deform the lobes into the body of the collar, terminating wrenching and locking the collar and pin together. The flats extend substantially parallel to the axis of the setting tool so that they substantially parallel the lobes they engage. Preferably, a pilot section below the wrenching and deforming flats has a surface that sets over a pilot section of the collar to maintain the driver and the collar concentric. The polygonal cross section of the wrenching and deforming flats can extend into the pilot section, in which case the flats in the pilot section can be relieved to define right cylindrical surfaces that cooperate with a right cylindrical surface of the collar to maintain alignment.

In one form, the present invention contemplates a driver having a deltoid socket with wrenching and deforming flats on the sides of an equilateral triangle. The corners of the deltoid sockets may be rounded. The sides of the socket have lines of minimum radius substantially equal to the radius of the collar to be set at the base of the lobes. The flats substantially parallel the axis of the driver and the collar. The flats near the lines of minimum radius engage the lobes and act as wrenching surfaces to tighten the collar on threads of a pin. When the lobes fail in radial compression, the driver rotates very slightly with respect to the collar to present the lines of minimum radius over the center line of the former lobes to complete the lobe deformation. The driver has a pilot section that generally continues the deltoid cross section except in zones of the minimum radii. There, the sides are relieved to form right cylindrical sections of a diameter corresponding to the diameter of the collar at a pilot section of the collar and disposed to capture the driver on the collar. This section preferably has a radius corresponding to the maximum radius of the lobes from the axis to the collar.

The driver may be formed as a hard metal insert such as a tungsten carbide insert. A sleeve or housing receives the insert by a press fit and has wrenching means for a driver, such as a square socket.

These and other features, aspects and advantages of the present invention will become more apparent from the following description, appended claims, and drawings.

BRIEF DESCRIPTION OF THE FIGURES

FIG. 1 is a bottom plan view of a preferred form of the driver;

FIG. 2 is a view taken in the plane of 2—2 of FIG. 1, but inverted, showing the driver setting a collar on a pin and a pair of sheets;

FIG. 3 shows an alternate embodiment of the present invention;

FIG. 4 shows a somewhat schematic view of the FIGS. 1 and 2 embodiments during the setting of the collar; and FIG. 5 shows a view similar to FIG. 4 at the terminal stages of collar setting.

DESCRIPTION OF THE PREFERRED EMBODIMENTS

FIGS. 1 and 2 illustrate a preferred driver 10 of the present invention. The driver includes an insert 12 and a housing 14. The insert is press-fitted into the housing. The insert may be made of a hard, wear-resistant material, such as tungsten carbide. The housing may be made of some more ductile and more easily formed material, such as steel.

The insert has a deltoid socket 16. The socket has wrenching and deforming surfaces or flats 18, 20, and 22 that in axial cross section fall on the legs of an equilateral triangle. The apexes of this triangle have rounded corners, such as corner 24 between sides 18 and 22.

The deltoid form of the socket extends completely through the insert. The socket has wrenching and deforming section 26 and a pilot section 28. The wrenching and deforming section is responsible for threading a collar 30 onto a pin 32, tightening the collar on the pin, and clamping a pair of sheets or workpieces 34 and 36 together between the collar and a head 37 of the pin. The pilot section cooperates with a corresponding pilot section 38 of the pin to keep the driver from canting off the axis of the collar, that is, keeping the driver and the collar concentric. Pilot section 28 has right cylindrical reliefs 40, 42, and 44. These reliefs have a curvature, the radius of which is substantially the same as the radius of pilot section 38 of the collar. The reliefs extend for substantially the same axial distance as the axial distance of pilot section 38. Collar 30 has a foot 45 of major diameter separated from pilot section 38 by an external shoulder 47. Shoulder 47 engages an end 49 of the driver and determines the axial position of the driver with respect to the collar and locates the wrenching and deforming section in proper axial relationship to the lobes. (In FIG. 2 one of the apexes is shown spaced from the shoulder. The flats rapidly reduce in radius from the axis of the collar and engage the shoulder along the three sides of the triangle.)

Flats 18, 20, and 22 serve to apply a wrenching torque onto collar 30 by engaging lobes 46 of the collar. These lobes have at their base a right cylindrical section 48 of the collar, the surface of which is at a constant radius from the axis of the collar. The distance from each of the flats 18, 20, and 22 at its closest approach to an axis of rotation 50 of the driver is the same as the radius of right cylindrical section 30. This line of closest proximity is indicated by the dash line 52 in FIG. 1. Flats 18, 20, and 22, in use, bear on the lobes with ever increasing force after the collar has been brought to bear on sheets 34 and 36. The stress on the lobes builds up rapidly until the lobes fail plastically in radial compression. Upon the occurrence of such failure, collar material radially inward of the lobes also fails plastically and displaces into void volumes between the pin and the collar. Preferably these void volumes are defined by flutes 53 of the pin. The displaced material within these flutes locks the collar and the pin together against unthreading. With the disappearance of the lobes, flats 18, 20, and 22 no longer see collar material, and the driver can rotate freely on the set collar.

It is very important that flats 18, 20, and 22 be parallel to axis 50 and of closely controlled distance from that axis. These conditions are necessary to effect a repeatable and accurate displacement of lobe material. If the surfaces were not parallel to the axis, it would be possible for a failure of less than all of the lobe material desired to be failed, with the consequence that the clamp-up load applied by the collar and the pin on the sheets would be less than design value. The same result obtains if the distance 52 varies appreciably. To obtain these conditions and to have a tool of long life, hardened insert 12 is provided. When the insert is of machinable steel, for example, tool steel, the deltoid can be formed by thru broaching, with a small amount of material being skived at a time. When the insert is formed of material such as tungsten carbide, powdered metallurgical techniques can be employed.

Housing 14 has a pocket 60 that receives insert 12. A shoulder 62 at an interior end of the pocket and on the housing provides a stop for the insert. A driving socket 64, which may be square in cross section, of the housing accepts a drive of a setting tool to rotate and apply torque to the driver.

FIG. 3 illustrates an alternate embodiment of the present invention. It shows a wrench 70 that has a deltoid socket 72 formed of a hardened insert. A housing 74 receives the insert. The wrench has a handle 76 for the application of torque. Wrench 70 is useful for less critical applications of the collar than demanded by driver 10. Insert 72 still has a piloting section to cooperate with a piloting section of the collar. As before, the insert can be secured in housing 74 by a press fit.

The action of the driver on the collar is seen to best advantage in FIGS. 4 and 5. There, driver 10 is setting collar 30 onto pin 32. As is standard, the pin has a hexagonal wrenching socket 80 to restrain its rotation. In FIG. 4, driver 10 is inserted onto the collar. It is then rotated so that each of flats 18, 20, and 22 engages a corresponding one of the lobes 46. The lobes maintain their shape and do not deform plastically until a predetermined design clamp-up load is applied between the collar and the sheets. At this time, flats 18, 20, and 22 fail the lobes in compression and force material of the collars radially inward of the lobes into the void volumes or interstices defined by flutes 53, as is illustrated in FIG. 5. (The flutes in FIGS. 4 and 5 are exaggerated for illustration.) In FIG. 5, lobe deformation is well under way but not yet completed. Upon completion of the deformation the outside of the collar within the axial span of the lobes will be cylindrical and the driver will be able to rotate freely on the set collar.

The present invention has been described with reference to certain preferred embodiments. The spirit and scope of the appended claims, however, should not necessarily be limited to the foregoing description.

What is claimed is:

1. A driver for setting a joint of a threaded collar, a threaded pin, and at least one sheet, the collar having plastically deformable lobes on its longitudinal exterior that upon the existence of a predetermined clamp-up load between the collar and the sheets plastically deform in radial compression and displace material of the collar into void volumes between the collar and the pin to lock the two together and terminate the action of the driver on the collar, the driver comprising:
   (a) a body having a rotational axis;
   (b) a socket in the body having a plurality of flats that when cut by radial planes normal to the rotational axis fall on the sides of a regular polygon, the flats being parallel to the rotational axis;
   (c) the minimum distance between each flat and the rotational axis corresponding substantially to the radius of the collar at the location of the lobes after their plastic deformation; and
   (d) means on the body to receive a wrenching torque applied to the driver so that the flats apply the torque to the lobes of the collar.

2. The driver claimed in claim 1 wherein the regular polygon is an equilateral triangle.

3. The driver claimed in claim 2 wherein the body comprises an insert and a housing, the insert being secured to the housing defining the socket, and being of a material harder than the housing.

4. The driver claimed in claim 1 wherein the socket includes a pilot section adapted to cooperate with a corresponding section of the collar to keep the axis of rotation of the body coaxial with the axis of the collar during the application of torque to the collar.

5. The driver claimed in claim 4 wherein the pilot section continues the cross section of the regular polygon and has cylindrical reliefs in the flats that have a diameter substantially equal to the diameter of the corresponding pilot section of the collar.

6. The driver claimed in claim 5 wherein the regular polygon is an equilateral triangle.

7. The driver claimed in claim 6 wherein the body comprises an insert and a housing secured to the insert, the housing having the means on the body to receive a wrenching torque, the insert defining the socket and being of a harder material.

8. The driver claimed in claim 7 wherein the apexes of the triangle are rounded.

9. A driver for use in applying torque to a collar that has regularly spaced, longitudinally extending, deformable lobes on its exterior, the lobes being plastically deformable upon the application of a radial compressive force by the driver that results from a predetermined clamp-up load on sheets against which the collar bears, the driver comprising:
(a) a housing;
(b) an insert secured in the housing, the insert being harder than the housing;
(c) a wrenching and deforming socket defined within the insert, the socket having an axis of rotation, a plurality of flats paralleling the axis of rotation, the flats in cross section normal to the axis of rotation falling on the sides of a regular polygon having as its center the axis of rotation of the driver, and the minimum distance between the axis of rotation and the flats substantially equaling the radius of the collar at the location of the lobes after their plastic deformation;
(d) means for applying a torque onto the driver to turn the driver against the resistance of the lobes; and
(e) means of the driver to axially locate the driver on the collar with the flats radially of the lobes.

10. The driver claimed in claim 9 wherein the insert includes a pilot section having a right cylindrical surface to cooperate with a surface of substantially the same diameter on the collar and prevent the driver from canting during the application of torque to the collar.

11. The driver claimed in claim 10 wherein the pilot section comprises an extension of the regular polygon of the socket with the cylindrical surface being in the walls of the flats.

12. The driver claimed in claim 11 wherein the regular polygon is an equilateral triangle.

13. The driver claimed in claim 12 wherein the apexes of the triangle are rounded.

14. The driver claimed in claim 11 wherein the apexes of the regular polygon are rounded.

* * * * *